(No Model.)
E. LANGEN.
METHOD OF AND APPARATUS FOR TREATING SEMI-LIQUID SUBSTANCES WITH PURIFYING OR OTHER LIQUIDS.
No. 323,694. Patented Aug. 4, 1885.
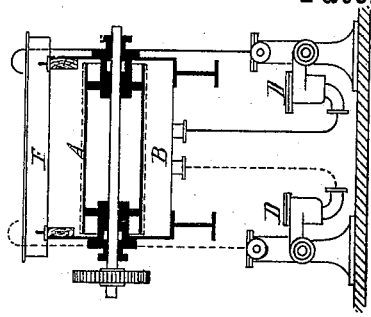
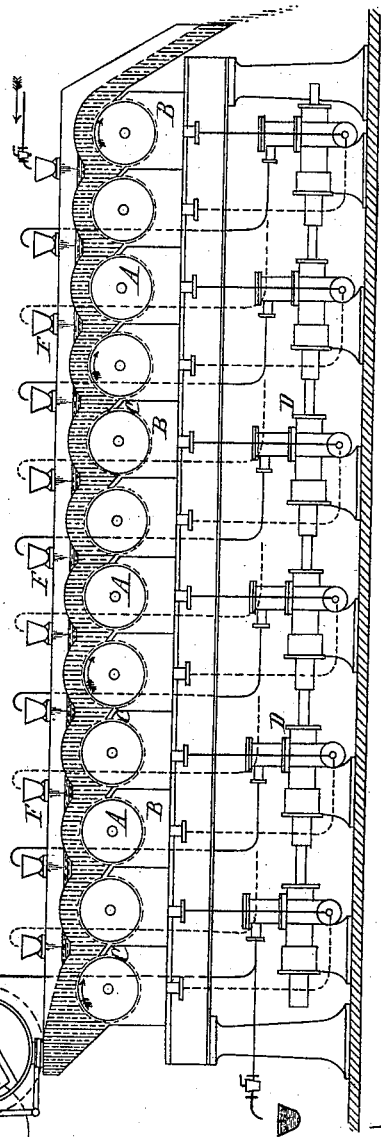
Witnesses.
Inventor
Eugen Langen,
By James L. Norris.
Atty

UNITED STATES PATENT OFFICE.

EUGEN LANGEN, OF COLOGNE, GERMANY.

METHOD OF AND APPARATUS FOR TREATING SEMI-LIQUID SUBSTANCES WITH PURIFYING OR OTHER LIQUIDS.

SPECIFICATION forming part of Letters Patent No. 323,694, dated August 4, 1885.

Application filed May 4, 1885. (No model.) Patented in England July 19, 1884, No. 10,367, and April 10, 1885, No. 4,473, and in Italy June 30, 1885, XXXVI, 176.

*To all whom it may concern:*

Be it known that I, EUGEN LANGEN, a citizen of Prussia, residing at Cologne, in the German Empire, have invented a new and useful Method of and Apparatus for Treating Semi-Liquid Substances with Purifying or other Liquids, (for which I have made applications for Letters Patent in Great Britain dated, respectively, July 19, 1884, and numbered 10,367, and April 10, 1885, and numbered 4,473, and have obtained patent in Italy dated June 30, 1885, Vol. XXXVI, No. 176,) of which the following is a specification.

According to the present invention semi-liquid substances—such as sugar—are treated with purifying or other liquids in successive stages, in such a manner that while the semi-liquid mass is caused to travel from one stage to another in one direction, the liquid with which it is being treated is caused to travel from stage to stage in the contrary direction, so that the liquid which has taken up the least amount of impurities is made to act upon material from which the greater amount of impurities has been removed, while the liquid which has taken up most impurities is made to act upon material that still contains most of its impurities.

Figure 1 of the accompanying drawings, shows a longitudinal section, and Fig. 2 a cross-section, of the apparatus which I employ for carrying out the above-described mode of operating.

It consists of the combination of several single apparatus, the number of which depends upon the condition in which it is desired to obtain the two end products, namely, the purified material, and the liquid employed.

Each apparatus consists of a hollow drum or cylinder, A, with perforated or sieve-like surface revolving in a trough, B, between scrapers C and a pump, D, for the purifying liquid. Above the apparatus, between each pair of cylinders, are arranged troughs or receptacles F for the liquid.

The solid material to be treated is mixed in an incorporating-vessel, E, at one end of the apparatus, with the liquid which travels forward from the other end of the apparatus. The semi-liquid mass thus produced flows uniformly onto the first cylinder, which, as also all the other cylinders, rotates, so as to carry the mass that passes onto it away from the incorporating-vessel, and onward to the next cylinder, so that it is thus conveyed from cylinder to cylinder along the whole apparatus. Assuming the apparatus to be fully in action—that is to say, the whole of the cylinders covered with the semi-liquid mass, and the pumps working—the action will be as follows: The fresh purifying liquor is caused to flow from the last liquor-trough onto the space between the last cylinder and the last but one, and it is drawn by means of the last pump (if necessary assisted by an air-pump) through the mass on the last cylinder into the trough below, and thence it is conveyed through the pump into the last liquor-trough but one, whence it flows onto and through the layer of mass upon the last cylinder but one. The liquor is again drawn through this cylinder by the last pump but one, and is thereby fed into the last trough but two, and so on. The above operation is repeated at every apparatus, the first pump being caused to convey as much of the liquor drawn off by it into the incorporating vessel as is necessary to produce the required consistency of the semi-liquid mass, the remainder of the liquor being conveyed to wherever required.

The treated or purified material is conveyed away from the last cylinder.

It will be evident that in place of employing pumps, any other means for drawing off the liquor—such as tubes acting on the principle of the barometer—may be employed.

Having thus described the nature of my invention, and the best means I know for carrying the same into practical effect, I wish it to be understood that I do not claim the method of passing one and the same body of purifying or other liquid consecutively through vessels charged with stationary masses of the material to be operated upon, in varying stages of purification, as I am aware that this has before been done; but

I claim—

1. The method of treating solid materials with liquids, wherein the material is caused to pass in a semi-liquid condition successively over a series of hollow cylinders with pervious surfaces, while the liquid with which it is to be treated flows upon it from the top, and after being drawn through the same by suction is conveyed onto the mass passing over the preceding cylinder, so that the purifying liquid, which is first introduced at one end of the apparatus, is made to flow through the same in the contrary direction to that in which the semi-liquid mass introduced at the other end of the machine is made to flow, whereby the liquid that has taken up most impurities is made to act upon the mass still containing most impurities, and the converse, the material purified to the greatest extent being made to flow off at the one end of the apparatus, while the liquid, saturated to the greatest extent with impurities, is made to flow off from the other end of the apparatus.

2. In apparatus for acting upon semi-liquid material in the manner herein set forth, the combination of the permeable cylinder A, trough B, scraper C, pump D, and liquor-troughs F, arranged and operating substantially as herein set forth.

In testimony whereof I have signed my name to this specification, in the presence of two subscribing witnesses, this 31st day of March, A. D. 1885.

EUGEN LANGEN.

Witnesses:
 TH. PEITMANN,
 Y. T. ZOLLENBERN.